United States Patent
Yoo et al.

(10) Patent No.: US 10,319,953 B2
(45) Date of Patent: Jun. 11, 2019

(54) BATTERY CELL HAVING HOLE

(71) Applicant: LG CHEM, LTD., Seoul (KR)

(72) Inventors: Jung Woo Yoo, Daejeon (KR); Je Young Kim, Daejeon (KR); Geun Chang Chung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/118,558

(22) PCT Filed: Jan. 30, 2015

(86) PCT No.: PCT/KR2015/001016
§ 371 (c)(1),
(2) Date: Aug. 12, 2016

(87) PCT Pub. No.: WO2015/126074
PCT Pub. Date: Aug. 27, 2015

(65) Prior Publication Data
US 2017/0047559 A1 Feb. 16, 2017

(30) Foreign Application Priority Data
Feb. 24, 2014 (KR) .................. 10-2014-0021024

(51) Int. Cl.
H01M 2/02 (2006.01)
H01M 10/04 (2006.01)
(Continued)

(52) U.S. Cl.
CPC ......... *H01M 2/0202* (2013.01); *H01M 2/026* (2013.01); *H01M 2/0287* (2013.01);
(Continued)

(58) Field of Classification Search
CPC ........... H01M 10/0463; H01M 10/052; H01M 10/0525; H01M 10/0585; H01M 10/0587;
(Continued)

(56) References Cited

U.S. PATENT DOCUMENTS

2003/0049522 A1* 3/2003 Doomernik ......... H01M 2/0267
429/93
2003/0099885 A1 5/2003 Kim et al.
(Continued)

FOREIGN PATENT DOCUMENTS

JP 59-146150 A 8/1984
JP 5-217603 A 8/1993
(Continued)

OTHER PUBLICATIONS

Machine Translation of Gomi et al. (JP2000090896(A)) (Year: 2000).*
(Continued)

*Primary Examiner* — Jonathan G Leong
*Assistant Examiner* — Victoria H Lynch
(74) *Attorney, Agent, or Firm* — Mintz Levin Cohn Ferris Glovsky and Popeo, P.C.; Kongsik Kim

(57) ABSTRACT

Disclosed herein is a battery cell configured to have a structure in which a stacked structure including a positive electrode, a negative electrode, and a separator interposed between the positive electrode and the negative electrode is mounted in a receiving part of a battery case, one or more holes are formed from the battery case to the positive electrode or the negative electrode of the electrode assembly, and a transparent window is formed in a portion of the battery case corresponding to the holes.

20 Claims, 4 Drawing Sheets

(51) Int. Cl.
*H01M 2/04* (2006.01)
*H01M 2/08* (2006.01)
*H01M 10/0525* (2010.01)
*H01M 10/0587* (2010.01)
*H01M 10/052* (2010.01)
*H01M 10/0585* (2010.01)

(52) U.S. Cl.
CPC ........... *H01M 2/0404* (2013.01); *H01M 2/08* (2013.01); *H01M 10/0463* (2013.01); *H01M 10/0525* (2013.01); *H01M 10/0587* (2013.01); *H01M 10/052* (2013.01); *H01M 10/0585* (2013.01); *H01M 2220/30* (2013.01)

(58) Field of Classification Search
CPC ........... H01M 2220/30; H01M 2/0202; H01M 2/026; H01M 2/0287; H01M 2/0404; H01M 2/08
See application file for complete search history.

(56) References Cited

U.S. PATENT DOCUMENTS

| | | | |
|---|---|---|---|
| 2004/0232506 A1* | 11/2004 | Kojima | H01G 9/2031 257/431 |
| 2011/0136023 A1 | 6/2011 | Bretthauer et al. | |
| 2013/0330585 A1 | 12/2013 | Utterman et al. | |
| 2014/0106193 A1 | 4/2014 | Kim et al. | |
| 2015/0044536 A1 | 2/2015 | Kwon et al. | |

FOREIGN PATENT DOCUMENTS

| | | | | |
|---|---|---|---|---|
| JP | 2000-90896 A | | 3/2000 | |
| JP | 2001-30407 A | | 2/2001 | |
| JP | 2004-333940 A | | 11/2004 | |
| JP | 2010-27368 A | | 2/2010 | |
| JP | 2010-102902 A | | 5/2010 | |
| JP | 2012-109176 A | | 6/2012 | |
| KR | 20010078633 A | * | 8/2001 | ............ H01M 10/48 |
| KR | 10-2001-0097437 A | | 11/2001 | |
| KR | 10-2002-0065293 A | | 8/2002 | |
| KR | 10-2013-0035754 A | | 4/2013 | |
| KR | 10-2013-0105272 A | | 9/2013 | |
| WO | WO 2012/127790 A1 | | 9/2012 | |
| WO | WO-2013146596 A1 | * | 10/2013 | ........ H01M 10/4285 |

OTHER PUBLICATIONS

Machine Translation of Sasaki (JP2010027368(A)) (Year: 2010).*
Machine Translation of Ko (KR20010078633(A)) (Year: 2001).*
International Search Report for PCT/KR2015/001016 dated Apr. 29, 2015.
Extended European Search Report for European Application No. 15752275.6, dated May 29, 2017.

* cited by examiner

【FIG. 1】
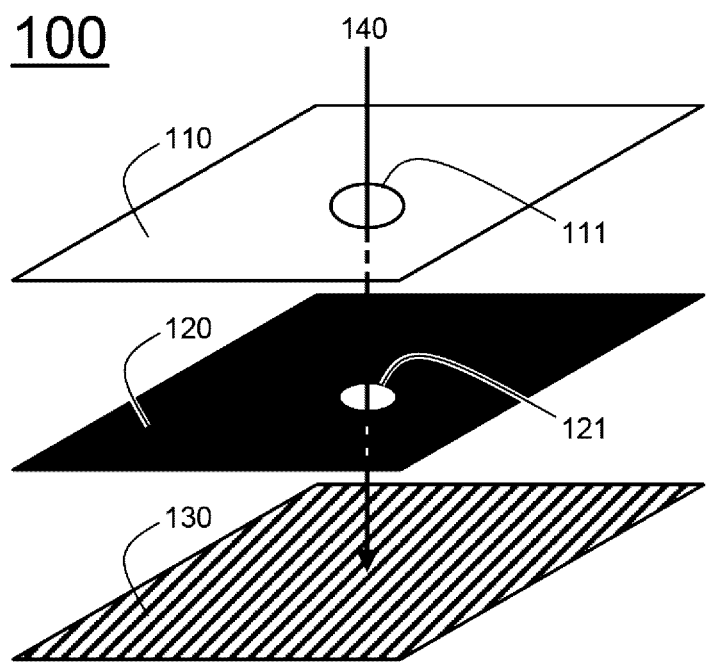

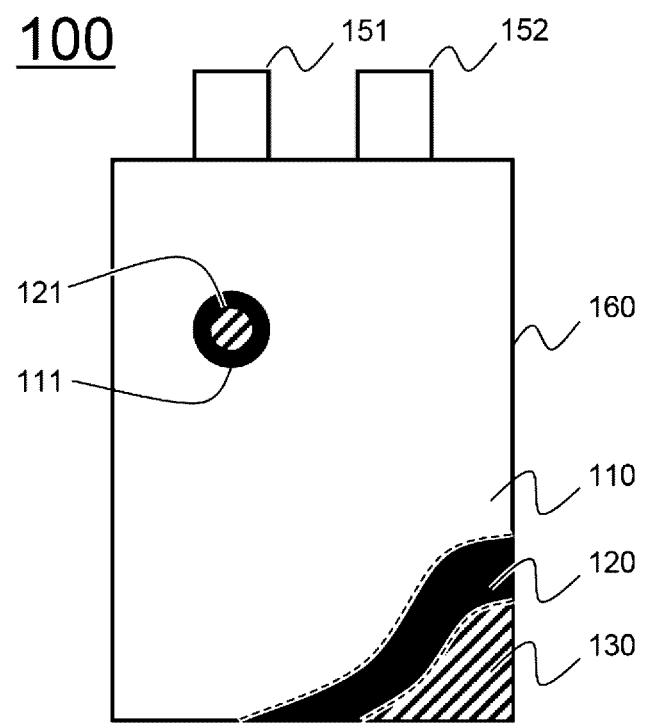
[FIG. 2]

【FIG. 3】
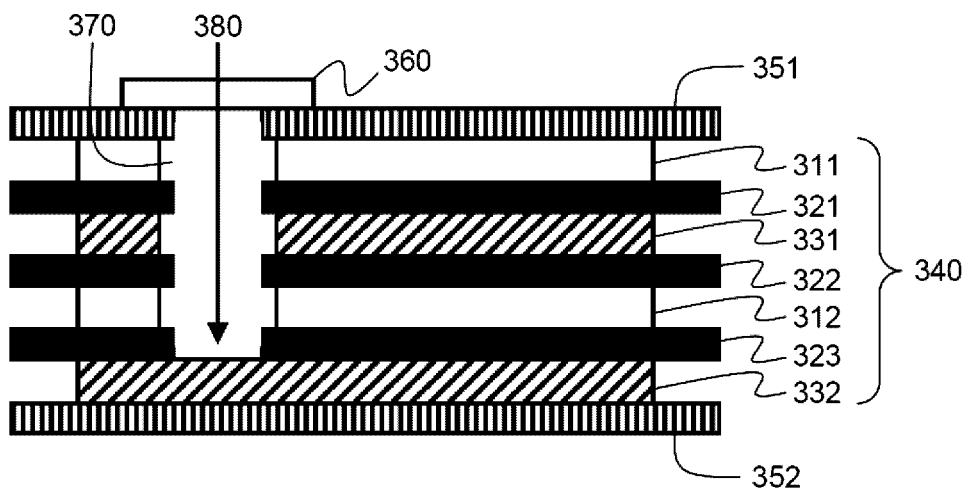
【FIG. 4】
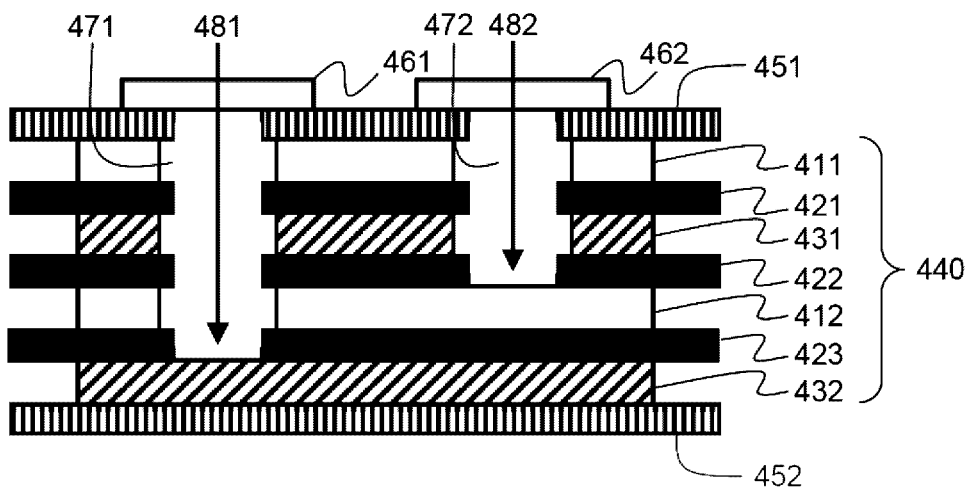

【FIG. 5】
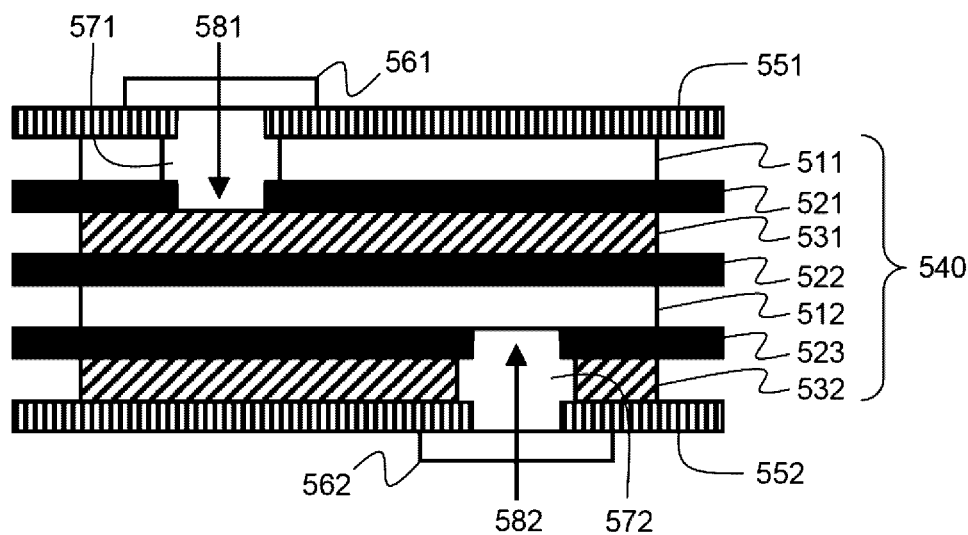
【FIG. 6】
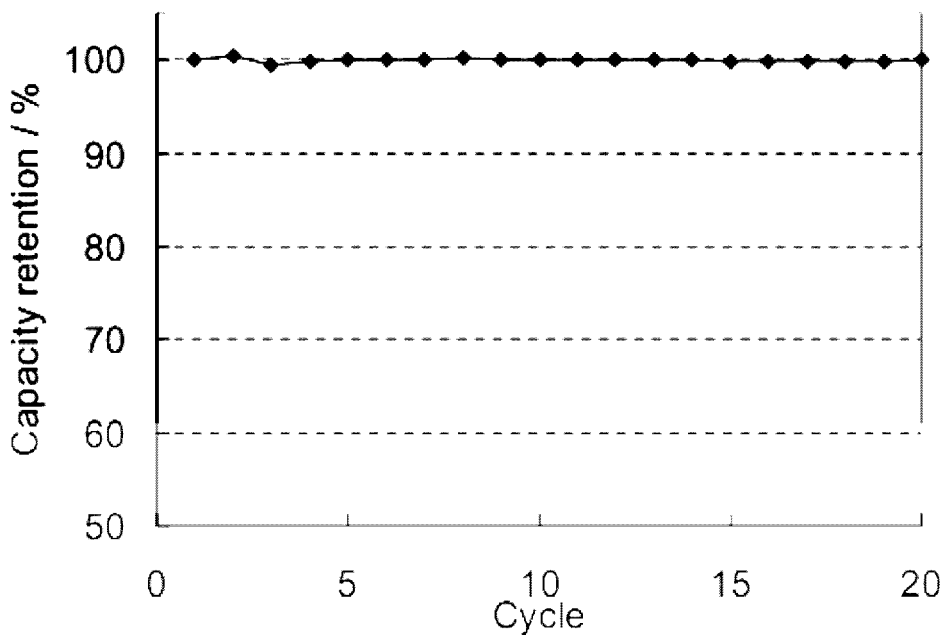

BATTERY CELL HAVING HOLE

TECHNICAL FIELD

The present invention relates to a battery cell having a hole.

BACKGROUND ART

As energy prices are increasing due to depletion of fossil fuels and interest in environmental pollution is escalating, the demand for environmentally-friendly alternative energy sources is bound to play an increasing role in the future. Thus, research into techniques for generating various powers, such as nuclear energy, solar energy, wind energy, and tidal power, is underway, and power storage apparatuses for more efficient use of the generated energy are also drawing much attention.

In particular, the demand for batteries as energy sources is rapidly increasing as mobile device technology continues to develop and the demand for the mobile devices continues to increase. Accordingly, much research on batteries satisfying various needs has been carried out.

In terms of the shape of batteries, the demand for prismatic secondary batteries or pouch type secondary batteries, which are thin enough to be applied to products, such as mobile phones, is very high. In terms of the material for batteries, on the other hand, the demand for lithium secondary batteries, such as lithium ion batteries and lithium ion polymer batteries, which exhibit high energy density, discharge voltage, and output stability, is very high.

In addition, secondary batteries may be classified based on the structure of an electrode assembly having a structure in which a positive electrode and a negative electrode are stacked in the state in which a separator is interposed between the positive electrode and the negative electrode. For example, the electrode assembly may be configured to have a jelly-roll (wound) type structure in which a long sheet type positive electrode and a long sheet type negative electrode are wound in the state in which a separator is disposed between the positive electrode and the negative electrode or a stacked type structure in which pluralities of positive electrodes and negative electrodes each having a predetermined size are sequentially stacked in the state in which separators are disposed respectively between the positive electrodes and the negative electrodes. In recent years, in order to solve problems caused by the jelly-roll type electrode assembly and the stacked type electrode assembly, there has been developed a stacked/folded type electrode assembly, which is a combination of the jelly roll type electrode assembly and the stacked type electrode assembly, having an improved structure in which predetermined numbers of positive electrodes and negative electrodes are sequentially stacked in the state in which separators are disposed respectively between the positive electrodes and the negative electrodes to constitute a unit cell, and then a plurality of unit cells is sequentially folded while being placed on a separation film.

In addition, based on the shape of the battery case of each of the secondary batteries, secondary batteries may be classified into a cylindrical battery configured to have a structure in which an electrode assembly is mounted in a cylindrical metal container, a prismatic battery configured to have a structure in which an electrode assembly is mounted in a prismatic metal container, and a pouch type battery configured to have a structure in which an electrode assembly is mounted in a pouch type case made of an aluminum laminate sheet.

Particularly, in recent years, much interest has been taken in a pouch type battery configured to have a structure in which such a stacked or stacked/folded type electrode assembly is mounted in a pouch type battery case made of an aluminum laminate sheet because of low manufacturing costs, light weight, easy modification in shape, etc. In addition, the use of such a pouch type battery has gradually increased.

In the above secondary battery, various phenomena and changes occur in electrodes constituting the electrode assembly during the operation of the battery, and the results of real-time observation of the phenomena and changes occurring in the electrodes may be used for basic studies and the diagnosis of the battery and for the improvement in performance of the battery. However, the electrode assembly is mounted in the opaque battery case in a sealed state, and the electrodes constituting the electrode assembly are stacked in the state in which separators are interposed respectively between the electrodes. For these reasons, it is difficult to observe various phenomena and changes occurring in the electrodes during the operation of the battery.

In addition, some additional batteries for experimentation used for observe the electrodes constituting the electrode assembly have been developed. However, the internal structure of the batteries for experimentation is complex, with the result that it is difficult to realize the batteries for experimentation using a conventional secondary battery manufacturing process. In addition, some components of the batteries for experimentation are different from those of conventional secondary batteries. Specifically, electrodes having a coin cell size are used, with the result that it is difficult to realize the same performance as the conventional secondary batteries. For this reason, it is not possible to apply the observed results of the electrodes to the conventional secondary batteries with high reliability.

Therefore, there is a high necessity for technology that is capable of fundamentally solving the above problems.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that, in the case in which holes are formed from a battery case to a positive electrode or a negative electrode of an electrode assembly, and a transparent window is formed in a portion of the battery case corresponding to the holes, as will be described hereinafter, it is possible to observe, in real time, various phenomena and changes occurring in the battery cell during the operation of the battery cell through the holes and the window, and the observed results may be used for basic studies and the diagnosis of the battery cell and for the improvement in performance of the battery cell, and, in the case in which holes and a window are formed in a conventional electrode assembly and a conventional battery case, it is possible to easily observe various phenomena and changes occurring in the battery cell during the operation of the battery cell through the holes and the window, whereby it is possible to observe various phenomena and changes of electrodes in the state in which the same performance as the conventional battery cell is realized without complex design and manufacture of an additional battery cell for experimentation, thereby improving the reliability of the results. The present invention has been completed based on these findings.

Technical Solution

In accordance with one aspect of the present invention, the above and other objects can be accomplished by the provision of a battery cell configured to have a structure in which a stacked structure including a positive electrode, a negative electrode, and a separator interposed between the positive electrode and the negative electrode is mounted in a receiving part of a battery case, one or more holes are formed from the battery case to the positive electrode or the negative electrode of the electrode assembly, and a transparent window is formed in a portion of the battery case corresponding to the holes.

In other words, the battery cell according to the present invention is configured such that one or more holes and a transparent window are formed in the electrode assembly and the battery case such that the holes communicate with the window in vertical section. Consequently, it is possible to observe, in real time, various phenomena and changes occurring in the battery cell during the operation of the battery cell through the holes and the window, and the observed results may be used for basic studies and the diagnosis of the battery cell and for the improvement in performance of the battery cell.

In addition, in the case in which holes and a window are formed in a conventional electrode assembly and a conventional battery case, it is possible to easily observe various phenomena and changes occurring in the battery cell during the operation of the battery cell through the holes and the window. Consequently, it is possible to observe various phenomena and changes of electrodes in the state in which the same performance as the conventional battery cell is realized without complex design and manufacture of an additional battery cell for experimentation, thereby improving the reliability of the results.

In a concrete example, the battery case may be a pouch type case made of a laminate sheet comprising a resin layer and a metal layer. However, the present invention is not limited thereto. The battery case may be a cylindrical container or a prismatic container. Furthermore, the battery case may include a cap mounted to the open upper end of the container.

In addition, the structure of the electrode assembly is not particularly restricted as long as one or more holes are formed from the battery case to the positive electrode or the negative electrode of the electrode assembly without the reduction in performance of the battery cell. Specifically, the electrode assembly may be a jelly-roll type electrode assembly configured to have a structure in which a positive electrode sheet and a negative electrode sheet are wound in a state in which a separation sheet is interposed between the positive electrode sheet and the negative electrode sheet, a stacked type electrode assembly configured to have a structure in which one or more positive electrode plates and one or more negative electrode plates are stacked in a state in which one or more separators are disposed respectively between the positive electrode plates and the negative electrode plates, or a stacked/folded type electrode assembly configured to have a structure in which stacked type unit cells, each having a positive electrode plate and a negative electrode plate, are folded while being placed on a separation sheet.

Meanwhile, the electrode assembly may be configured to have a structure in which, when viewed in vertical section, electrode A, which is a positive electrode or a negative electrode, and electrode B, which is an electrode having a polarity opposite to the polarity of electrode A, are alternately stacked in a state in which a separator is interposed between electrode A and electrode B to constitute at least one pair of electrodes, and the outermost electrodes in the stacked structure may be electrode A and electrode B or electrodes A.

In other words, the electrode assembly may be configured to have a structure in which, when viewed in vertical section, a positive electrode and a negative electrode are alternately stacked to constitute at least one pair of electrodes, and the outermost electrodes in the stacked structure may have the same polarity or different polarities.

In a concrete example, assuming that, from one side of the battery case at which the window is located, a first electrode of the electrode assembly is electrode $A_1$, a second electrode of the electrode assembly is electrode $B_2$, a (k−1)-th electrode of the electrode assembly is electrode $A_{(k-1)}$, and a k-th electrode of the electrode assembly is electrode $B_k$ (where k is a natural number equal to or greater than 4), holes are formed from the first electrode to the (k−1)-th electrode so as to observe the k-th electrode.

More specifically, on the assumption that, from one side of the battery case at which the window is located, a first electrode of the electrode assembly is electrode $A_1$, and a second electrode having a polarity opposite to the polarity of the first electrode is electrode $B_2$, a (k−1)th electrode of the electrode assembly is electrode $A_{(k-1)}$, and a k-th electrode of the electrode assembly is electrode $B_k$.

In this case, holes may be formed from the first electrode to the (k−1)-th electrode of the electrode assembly so as to observe the k-th electrode, and a window may be formed in a portion of the battery case corresponding to the holes. Consequently, it is possible to easily observe various phenomena and changes occurring in the k-th electrode during the operation of the battery cell through the window.

In another concrete example, assuming that, from one side of the battery case at which the window is located, a first electrode of the electrode assembly is electrode $A_1$, a second electrode of the electrode assembly is electrode $B_2$, a (k−1)-th electrode of the electrode assembly is electrode $A_{(k-1)}$, and a k-th electrode of the electrode assembly is electrode $B_k$ (where k is a natural number equal to or greater than 4), holes are formed from the first electrode to a (k−2)-th electrode so as to observe the (k−1)-th electrode.

More specifically, on the assumption that, from one side of the battery case at which the window is located, a first electrode of the electrode assembly is electrode $A_1$, and a second electrode having a polarity opposite to the polarity of the first electrode is electrode $B_2$, a (k−1)-th electrode of the electrode assembly is electrode $A_{(k-1)}$, and a k-th electrode of the electrode assembly is electrode $B_k$.

In this case, holes may be formed from the first electrode to the (k−2)-th electrode of the electrode assembly so as to observe the (k−1)th electrode, and a window may be formed in a portion of the battery case corresponding to the holes. Consequently, it is possible to easily observe various phenomena and changes occurring in the (k−1)th electrode during the operation of the battery cell through the window.

Meanwhile, two or more holes and windows may be formed in the electrode assembly and the battery case.

Specifically, the two or more holes and windows may be formed in different portions. The two or more holes may be formed so as to be observed from one side of the battery case, the opposite side of the battery case, or the opposite sides of the battery case, whereby it is possible to observe various phenomena and changes occurring in different electrodes during the operation of the battery cell through the holes and windows.

Each of the holes may have an area equivalent to 1 to 15%, specifically 3 to 5%, the entire area of one surface of the battery cell when viewed in plan.

If the area of each of the holes is less than 1% the entire area of one surface of the battery cell, it is difficult to observe various phenomena and changes occurring in the battery cell during the operation of the battery cell due to an insufficient space. On the other hand, if the area of each of the holes is greater than 15% the entire area of one surface of the battery cell, the performance of the battery cell may be lower than that of a conventional battery cell, with the result that the reliability of the observed results may be reduced.

In addition, the holes may be formed in the separator and one of the electrodes of the electrode assembly. The hole formed in the separator may have an area less than the area of the hole formed in one of the electrodes.

In this case, the area of the hole formed in the separator may be 60 to 90%, specifically 70 to 80%, the area of the hole formed in one of the electrodes.

If the area of the hole formed in the separator is less than 60% the area of the hole formed in one of the electrodes, it is difficult to observe various phenomena and changes occurring in the battery cell during the operation of the battery cell due to an insufficient space, as described above. On the other hand, if the area of the hole formed in the separator is greater than 90% the area of the hole formed in one of the electrodes, the positive electrode and the negative electrode, which face each other in the state in which the separator is interposed between the positive electrode and the negative electrode, come into direct contact with each other, with the result that a short circuit may occur in the battery cell.

Meanwhile, the battery case may be provided at a portion thereof corresponding to the holes of the electrode assembly with a transparent window. More specifically, the battery case may be provided at a portion thereof corresponding to the holes of the electrode assembly with an opening, and a transparent member may be attached to the opening to constitute a window.

Consequently, it is possible to easily observe the electrode through the window formed by attaching the transparent member and the holes corresponding to the window.

In this case, the transparent member may be attached to the opening of the battery case using an adhesive or an adhesive tape so as to secure the sealability of the opening of the battery case. However, the present invention is not limited thereto. The attachment method is not particularly restricted as long as it is possible to secure the sealability of the opening of the battery case while not changing the performance of the battery cell.

In a concrete example, the adhesive may be at least one selected from the group consisting of an epoxy adhesive, a ceramic adhesive, and an acrylic adhesive. In another concrete example, the adhesive tape may be at least one selected from the group consisting of a polyimide tape, a polyester tape, and a polyethylene tape.

The kind of the adhesive and the adhesive tape is not particularly restricted as long as it is possible to secure the sealability of the opening of the battery case through stable attachment of the transparent member to the opening of the battery case while not changing the performance of the battery cell.

In addition, the transparent member may be an optically transparent film that is capable of making it easy to observe the electrode. For example, the transparent member may be a polymer film. Specifically, the transparent member may be at least one selected from the group consisting of a polypropylene film and a cycloolefin-based film. More specifically, the transparent member may be a cycloolefin-based film that exhibits high chemical resistance and moisture resistance.

In addition, the thickness of the transparent member may be 20 to 150%, specifically 50 to 100%, the thickness of the battery case. More specifically, the thickness of the transparent member may be 20 to 100 μm in consideration of the fact that the thickness of a general pouch type battery case is 100 to 150 μm.

If the thickness of the transparent member is less than 50% the thickness of the battery case, it is not possible to provide a desired sealing force when the window is formed in the opening of the battery case. On the other hand, if the thickness of the transparent member is greater than 150% the thickness of the battery case, it is difficult to clearly observe the electrode.

Meanwhile, a thin glass plate having a small thickness may be further attached to the window of the battery case in addition to the transparent member, thereby improving the moisture permeation preventing effect.

In a concrete example, the electrode of the battery cell according to the present invention may be observed using Raman spectroscopy, X-ray diffraction; (XRD), atomic force microscope (AFM), and scanning tunneling microscope (STM). In the case in which the electrode is observed using Raman spectroscopy, the peak of a polypropylene film and the peak of graphite may overlap. In order to more accurately observe the electrode, therefore, a cycloolefin-based film may be used as the transparent member constituting the window of the battery case.

In addition, in the case in which the electrode is observed using atomic force microscope or scanning tunneling microscope, contact type observation is performed for the electrode. For this reason, the transparent member constituting the window is not attached to the opening of the battery case. Consequently, the electrode may be observed in an environment in which moisture is controlled, such as a glove box or a dry room, in order to prevent or minimize the change of the electrode due to external environments.

Meanwhile, the kind of the battery cell according to the present invention is not particularly restricted. In a concrete example, the battery cell may be a lithium secondary battery, such as a lithium ion battery or a lithium ion polymer battery, which exhibit high energy density, discharge voltage, and output stability.

In general, a lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and drying the mixture. A filler may be further added to the mixture as needed.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or conductive materials, such as polyphenylene derivatives may be used as the conductive agent.

The binder is a component assisting in binding between the active material and the conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying and drying a negative electrode active material to a negative electrode current collector. The above-described components may be selectively added to the negative electrode active material as needed.

As the negative electrode active material, for example, there may be used carbon, such as non-graphitizing carbon or a graphite-based carbon; a metal composite oxide, such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \le x \le 1$; $1 \le y \le 3$; $1 \le z \le 8$); lithium metal; lithium alloy; silicon-based alloy; tin-based alloy; metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator and the separation film are interposed between the positive electrode and the negative electrode. As the separator and the separation film, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as polymer, is used as an electrolyte, the solid electrolyte may also function as the separator.

In addition, in a concrete example, the separator and/or the separation film may be an organic/inorganic composite porous safety reinforcing separator (SRS) for improving the safety of a battery having high-energy density.

The SRS separator may be manufactured by applying inorganic particles and a binder polymer, as active layer components, to a polyolefin separator base. In addition to a porous structure included in the separator base, a uniform porous structure may be formed due to interstitial volumes among the inorganic particles, as the active layer component.

In the case in which the organic/inorganic composite porous separator is used, it is possible to restrain the increase in thickness of the battery due to swelling at the time of formation as compared with the case in which a normal separator is used. In addition, in the case in which a polymer that can gel at the time of impregnating a liquid electrolytic solution is used as the binder polymer, the polymer may also be used as an electrolytic.

In addition, the organic/inorganic composite porous separator may exhibit excellent adhesive characteristics by adjusting the contents of the inorganic particles and the binder polymer, which are active layer components in the separator. Consequently, a battery assembly process may be easily carried out.

The inorganic particles are not particularly restricted so long as the inorganic particles are electrochemically stable. That is, the inorganic particles that can be used in the present invention are not particularly restricted so long as the inorganic particles are not oxidized and/or reduced within an operating voltage range (e.g. 0 to 5 V based on Li/Li+) of a battery to which the inorganic particles are applied. In particular, in the case in which inorganic particles having ion conductivity are used, it is possible to improve ion conductivity in an electrochemical element, thereby improving the performance of the battery. Consequently, it is preferable that ion conductivity of the inorganic particles be as high as possible. In addition, in the case in which the inorganic particles have high density, it may be difficult to disperse the inorganic particles at the time of coating, and the weight of the battery may increase. For these reasons, it is preferable that density of the inorganic particles be as low as possible. Additionally, in the case in which the inorganic particles have high permittivity, a degree of dissociation of electrolyte salt, such as lithium salt, in a liquid electrolyte may increase, thereby improving ion conductivity of the electrolytic solution.

The non-aqueous electrolytic solution containing lithium salt is composed of a polar organic electrolytic solution and lithium salt. As the electrolytic solution, a non-aqueous liquid electrolytic solution, an organic solid electrolyte, or an inorganic solid electrolyte may be used.

As examples of the non-aqueous liquid electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, $LiI$, $Li_5NI_2$, $Li_3N$—$LiI$—$LiOH$, $LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature retention characteristics, the non-aqueous electrolytic solution may further include carbon dioxide gas.

BRIEF DESCRIPTION OF DRAWINGS

The above and other objects, features and other advantages of the present invention will be more clearly understood from the following detailed description taken in conjunction with the accompanying drawings, in which:

FIG. 1 is a typical view schematically showing a method of manufacturing an electrode assembly constituting a battery cell according to an embodiment of the present invention;

FIG. 2 is a plan view schematically showing the structure of an electrode assembly manufactured using the method of FIG. 1; and FIGS. 3 to 6 are typical views schematically showing stacked structures of battery cells according to various embodiments of the present invention.

BEST MODE

Now, exemplary embodiments of the present invention will be described in detail with reference to the accompanying drawings. It should be noted, however, that the scope of the present invention is not limited by the illustrated embodiments.

FIG. 1 is a typical view schematically showing a method of manufacturing an electrode assembly constituting a battery cell according to an embodiment of the present invention Referring to FIG. 1, an electrode assembly 109 is configured to have a stacked structure including a positive electrode 110, a negative electrode 130, and a separator 120 interposed between the positive electrode 110 and the negative electrode 130.

A hole 111 is formed in the positive electrode 110, and a hole 121 is formed in the separator 120. The holes 111 and 121 are formed in corresponding positions of the positive electrode 110 and the separator 120 so as to communicate with each other (140).

Consequently, it is possible to observe various phenomena and changes occurring in the negative electrode 130 during the operation of the battery cell through the holes 111 and 121, formed in the positive electrode 110 and the separator 120.

FIG. 2 is a plan view schematically showing the structure of an electrode assembly manufactured using the method of FIG. 1.

Referring to FIG. 2, an electrode assembly 100 includes a main body 160, configured to have a structure in which a positive electrode 110 and a negative electrode 130 are stacked in the state in which a separator 120 is interposed between the positive electrode 110 and a negative electrode 130, and a positive electrode terminal 151 and a negative electrode terminal 152 protruding from one side of the main body 160.

Holes 111 and 121 are formed in corresponding positions of the positive electrode 110 and the separator 120 so as to communicate with each other. Consequently, it is possible to observe the negative electrode 130 in the electrode assembly 100 through the holes 111 and 121.

The area of the hole 121 formed in the separator 120 is less than the area of the hole 111 formed in the positive electrode 110. Specifically, the area of the hole 121 formed in the separator 120 is 60 to 90% the area of the hole 111 formed in the positive electrode 110, thereby preventing direct contact between the positive electrode 110 and the negative electrode 130 and thus preventing the occurrence of a short circuit.

FIGS. 3 to 6 are typical views schematically showing stacked structures of battery cells according to various embodiments of the present invention.

Referring first to FIG. 3, an electrode assembly 340 of a battery cell 300 is configured to have a structure in which two positive electrodes 311 and 312 and two negative electrodes 331 and 332 are stacked in the state in which the separators 321, 322, and 323 are interposed between the positive electrodes 311 and 312 and the negative electrodes 331 and 332. The outermost electrodes 311 and 332, i.e. the positive electrode 311 and the negative electrode 332, of the electrode assembly 340 face battery cases 351 and 352, respectively.

Holes 370 are formed from one of the battery cases, i.e. the battery case 351, to the separator before the fourth electrode, i.e. the negative electrode 332, of the electrode assembly 340, and a transparent window 360 is formed in a portion of the battery case 351 corresponding to the holes 370.

Communication is achieved from the battery case 351, at which the window 360 is located, to the third electrode, i.e. the positive electrode 312, and the separator 323 through the holes 370 as indicated by reference numeral 380.

Consequently, it is possible to easily observe various phenomena and changes occurring in the fourth electrode, i.e. the negative electrode 332, of the electrode assembly 340 during the operation of the battery cell 300 through the transparent window 360.

Referring first to FIG. 4, an electrode assembly 440 of a battery cell 400 is configured to have a structure in which two positive electrodes 411 and 412 and two negative electrodes 431 and 432 are stacked in the state in which the separators 421, 422, and 423 are interposed between the positive electrodes 411 and 412 and the negative electrodes 431 and 432, in the same manner as in FIG. 3. The outermost electrodes 411 and 432, i.e. the positive electrode 411 and the negative electrode 432, of the electrode assembly 440 face battery cases 451 and 452, respectively.

Holes 471 are formed from one of the battery cases, i.e. the battery case 451, to the separator before the fourth electrode, i.e. the negative electrode 432, of the electrode assembly 440. In addition, holes 472 are further formed from one of the battery cases, i.e. the battery case 451, to the separator before the third electrode, i.e. the positive electrode 412, of the electrode assembly 440. Transparent windows 461 and 462 are formed in portions of the battery case 451 corresponding to the holes 471 and 472, respectively.

Communication is achieved from the battery case 451, at which the window 461 is located, to the third electrode, i.e. the positive electrode 412, and the separator 423 through the holes 471. In addition, communication is achieved from the battery case 451, at which the window 462 is located, to the second electrode, i.e. the negative electrode 431, and the separator 422 through the holes 472.

That is, the holes 471 and 472 are formed in the electrode assembly 440 and the battery case 451 of the battery cell 400, and the transparent windows 461 and 462 are formed in portions of the battery case 451 corresponding to the holes 471 and 472. Consequently, it is possible to easily observe various phenomena and changes occurring in the fourth electrode, i.e. the negative electrode 432, and the third electrode, i.e. the positive electrode 412, of the electrode assembly 440 during the operation of the battery cell 400 through the windows 461 and 462.

The windows may be formed in the same side of the battery case. Alternatively, the windows may be formed in opposite sides of the battery case. The structure in which windows are formed in opposite sides of the battery case is shown in FIG. 5.

Referring to FIG. 5, holes 471 are formed from a one-side battery case 551 to the separator before a second electrode, i.e. a negative electrode 531, of an electrode assembly 540. In addition, holes 472 are further formed from the other-side battery case 552 to the separator before a second electrode, i.e. a positive electrode 512, of the electrode assembly 540. Transparent windows 561 and 562 are formed in portions of the battery cases 551 and 552 corresponding to the holes 571 and 572, respectively.

Communication is achieved from the battery case 551, at which the window 561 is located, to the first electrode, i.e. the positive electrode 511, and the separator 521 through the holes 571. In addition, communication is achieved from the battery case 551, at which the window 562 is located, to the first electrode, i.e. the negative electrode 532, and the separator 523 through the holes 572.

That is, the holes 571 and 572 are formed in the electrode assembly 540 and the battery cases 551 and 552 of the battery cell 500, and the windows 561 and 562 are formed in portions of the battery cases 551 and 552 corresponding to the holes 571 and 572. Specifically, the holes 571 and 572 and the windows 561 and 562 are formed in the one-side battery case 551 and the other-side battery case 552, respectively.

Consequently, it is possible to easily observe various phenomena and changes occurring in the second electrode, i.e. the negative electrode 531, from one side of the electrode assembly 540, and the second electrode, i.e. the positive electrode 512, from the other side of the electrode assembly 540 during the operation of the battery cell 500 through the windows 561 and 562.

Now, the present invention will be described with reference to the following example. However, the example is provided only for illustration of the present invention and should not be construed as limiting the scope of the present invention.

EXAMPLE 1

An electrode assembly having holes formed in a positive electrode and a separator such that the positive electrode and the separator communicated with each other through the holes was manufactured as shown in FIG. 1, was mounted in a pouch type battery case, an EC/EMC-based electrolyte containing 1M $LiPF_6$ lithium salt was injected to the battery case so as to impregnate electrodes with the electrolyte, and the battery case was sealed to manufacture a battery cell. An opening was formed in a portion of the pouch type battery case corresponding to the holes of the electrode assembly, and the opening was covered by a window having a cycloolefin-based film attached thereto.

EXPERIMENTAL EXAMPLE 1

The battery cell manufactured according to Example 1 was charged and discharged at a voltage of 4.2V to 2.5V, and the capacity retention of the battery cell based on the charge and discharge cycle was measured. The results are shown in FIG. 6.

Referring to FIG. 6, it can be seen that there was no change in capacity retention of the battery cell even though the holes were formed in the electrode assembly of the battery cell and the window was formed in the portion of the battery case corresponding to the holes.

That is, in the case in which the holes are formed in the electrode assembly of the battery cell and the transparent window is formed in the portion of the battery case corresponding to the holes, it is possible to observe, in real time, various phenomena and changes occurring in the battery cell during the operation of the battery cell through the holes and the window without change in performance of the battery cell, thereby improving the reliability of the results.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention is configured such that holes are formed from a battery case to a positive electrode or a negative electrode of an electrode assembly, and a transparent window is formed in a portion of the battery case corresponding to the holes. Consequently, it is possible to observe, in real time, various phenomena and changes occurring in the battery cell during the operation of the battery cell through the holes and the window, and the observed results may be used for basic studies and the diagnosis of the battery cell and for the improvement in performance of the battery cell. In addition, in the case in which holes and a window are formed in a conventional electrode assembly and a conventional battery case, it is possible to easily observe various phenomena and changes occurring in the battery cell during the operation of the battery cell through the holes and the window. Consequently, it is possible to observe various phenomena and changes of electrodes in the state in which the same performance as the conventional battery cell is realized without complex design and manufacture of an additional battery cell for experimentation, thereby improving the reliability of the results.

The invention claimed is:

1. A battery cell configured to have a structure in which an electrode assembly of a stacked structure comprising a repeating pattern of a positive electrode, a negative electrode, and a separator interposed between the positive electrode and the negative electrode is mounted in a receiving part of a battery case,
one or more holes are formed in the battery case opposite to an outermost positive electrode or an outermost negative electrode of the electrode assembly, and
a transparent window is formed in a portion of the battery case corresponding to the one or more holes so as to cover the one or more holes,
wherein at least one of the positive electrodes or the negative electrodes in the stacked structure includes a through hole aligned with the one or more holes formed in the battery case, and
wherein at least one of the positive electrodes or the negative electrodes in the stacked structure does not include the through hole aligned with one or more of the holes formed in the battery case.

2. The battery cell according to claim 1, wherein the battery case is a pouch type case made of a laminate sheet comprising a resin layer and a metal layer.

3. The battery cell according to claim 1, wherein the electrode assembly is a stacked type electrode assembly configured to have a structure in which one or more positive electrode plates and one or more negative electrode plates are stacked in a state in which one or more separators are disposed respectively between the positive electrode plates and the negative electrode plates, or a stacked/folded type electrode assembly configured to have a structure in which stacked type unit cells, each having a positive electrode plate and a negative electrode plate, are folded while being placed on a separation sheet.

4. The battery cell according to claim 1, wherein the electrode assembly is configured to have a structure in which, when viewed in vertical section, electrode A, which is the positive electrode or the negative electrode, and electrode B, which is an electrode having a polarity opposite to the polarity of electrode A, are alternately stacked in a state in which the separator is interposed between electrode A and electrode B to constitute at least one pair of electrodes, and outermost electrodes in the stacked structure are electrode A and electrode B or electrodes A.

5. The battery cell according to claim 4, wherein, assuming that, from one side of the battery case at which the window is located, a first electrode of the electrode assembly is electrode $A_1$, a second electrode of the electrode assembly is electrode $B_2$, a (k−1)-th electrode of the electrode assembly is electrode $A_{(k-1)}$, and a k-th electrode of the electrode assembly is electrode $B_k$ (where k is a natural number equal to or greater than 4), holes are formed from the first electrode to the (k−1)-th electrode so as to observe the k-th electrode.

6. The battery cell according to claim 4, wherein, assuming that, from one side of the battery case at which the window is located, a first electrode of the electrode assembly is electrode $A_1$, a second electrode of the electrode assembly is electrode $B_2$, a (k−1)-th electrode of the electrode assembly is electrode $A_{(k-1)}$, and a k-th electrode of the electrode assembly is electrode $B_k$ (where k is a natural number equal to or greater than 4), holes are formed from the first electrode to a (k−2)-th electrode so as to observe the (k−1)-th electrode.

7. The battery cell according to claim 1, wherein two or more holes and windows are formed in the electrode assembly and the battery case.

8. The battery cell according to claim 7, wherein the two or more holes and windows are formed in different portions.

9. The battery cell according to claim 7, wherein the two or more holes are formed at opposing surfaces of the battery case.

10. The battery cell according to claim 1, wherein each of the one or more holes has an area equivalent to 1 to 15% an entire area of one surface of the battery cell when viewed in plan.

11. The battery cell according to claim 1, wherein a through hole formed in the separator has an area less than an area of the through hole formed in the at least one of the positive electrodes or the negative electrodes.

12. The battery cell according to claim 11, wherein the area of the through hole formed in the separator is 60 to 90% the area of the through hole formed in the at least one of the positive electrodes or the negative electrodes.

13. The battery cell according to claim 1, wherein the battery case is provided at a portion thereof corresponding to the holes of the electrode assembly with an opening, and a transparent member is attached to the opening to constitute a window.

14. The battery cell according to claim 1, wherein the transparent member is attached to the opening using an adhesive or an adhesive tape.

15. The battery cell according to claim 14, wherein the adhesive is at least one selected from a group consisting of an epoxy adhesive, a ceramic adhesive, and an acrylic adhesive.

16. The battery cell according to claim 14, wherein the adhesive tape is at least one selected from a group consisting of a polyimide tape, a polyester tape, and a polyethylene tape.

17. The battery cell according to claim 1, wherein the transparent member includes a cycloolefin-based film.

18. The battery cell according to claim 1, wherein the battery cell is a lithium secondary battery.

19. The battery cell according to claim 1, wherein communication is achieved from the battery case to the positive electrode or the negative electrode to be observed.

20. A battery cell configured to have a structure in which an electrode assembly is mounted in a receiving part of a battery case, wherein the electrode assembly is a jelly-roll type electrode assembly configured to have a structure in which a positive electrode sheet and a negative electrode sheet are wound in a state in which a separation sheet is interposed between the positive electrode sheet and the negative electrode sheet to form repeatedly rolled layers of a positive electrode, a negative electrode, and a separator interposed between the positive electrode and the negative electrode, one or more holes are formed in the battery case opposite to an outermost positive electrode or an outermost negative electrode of the electrode assembly, and a transparent window is formed in a portion of the battery case corresponding to the one or more holes so as to cover the one or more holes, wherein at least one of the rolled layers of the positive electrode or the negative electrode includes a through hole aligned with the one or more holes formed in the battery case, and wherein at least one of the rolled layers of the positive electrode or the negative electrode does not include the through hole aligned with one or more of the holes formed in the battery case.

* * * * *